United States Patent
Aldaag et al.

(10) Patent No.: US 9,129,297 B2
(45) Date of Patent: Sep. 8, 2015

(54) SYSTEM AND METHOD FOR PROVIDING INTERNET BASED DATING SERVICES

(71) Applicants: Roi Aldaag, Tel Aviv (IL); Yoav Aldaag, Ra'anana (IL)

(72) Inventors: Roi Aldaag, Tel Aviv (IL); Yoav Aldaag, Ra'anana (IL)

(*) Notice: Subject to any disclaimer, the term of this patent is extended or adjusted under 35 U.S.C. 154(b) by 0 days.

(21) Appl. No.: 14/062,725

(22) Filed: Oct. 24, 2013

(65) Prior Publication Data

US 2014/0117087 A1    May 1, 2014

Related U.S. Application Data

(60) Provisional application No. 61/718,239, filed on Oct. 25, 2012.

(51) Int. Cl.
*G06K 5/00* (2006.01)
*G06Q 30/02* (2012.01)

(52) U.S. Cl.
CPC ........................... *G06Q 30/02* (2013.01)

(58) Field of Classification Search
CPC .................................. G06F 7/08; G06Q 20/346
USPC .................... 235/380, 375, 382, 487, 492
See application file for complete search history.

(56) References Cited

U.S. PATENT DOCUMENTS

| | | | |
|---|---|---|---|
| 6,061,681 A | 5/2000 | Collins | |
| 6,594,502 B1 | 7/2003 | Koester | |
| 7,592,910 B2* | 9/2009 | Tuck et al. | 340/539.13 |
| 8,543,465 B2* | 9/2013 | Cheek et al. | 705/26.1 |
| 2013/0238979 A1* | 9/2013 | Sayers et al. | 715/234 |

\* cited by examiner

*Primary Examiner* — Daniel St Cyr
(74) *Attorney, Agent, or Firm* — Baker & Hostetler LLP (57) ABSTRACT

A system and method for providing a dating service using dating cards with unique QR code/s. A registered member of the dating service acquires one or more dating cards with unique QR codes and presents the card a potential date. When the potential date scans the QR code, the potential date is forwarded to personal information of the registered member. The potential date therefore can appraise the merits of the registered member based on the personal information and decide whether to establish further contact. Preferably, the dating card has a detachable tab with a unique QR code that correlates to the QR code on the card that is handed to the potential date for tracking and access control purposes. Each card can reveal a partial or different façade of the personal information and display a different personal greeting message.

20 Claims, 4 Drawing Sheets

SYSTEM AND METHOD FOR PROVIDING INTERNET BASED DATING SERVICES

CROSS REFERENCE TO RELATED APPLICATIONS

This application claims the benefit of U.S. Provisional Patent Application No. 61/718,239, filed Oct. 25, 2012, which is hereby incorporated by reference in its entirety.

TECHNICAL FIELD

The present invention relates to a system and method for providing dating services, for matching people socially. Specifically, the method is based on receiving a 'dating card' including a security key. The recipient of the dating card is directed to a network resource to retrieve further information about the dating card owner.

BACKGROUND

Dating services are of ever growing demand. An increasing number of individuals each desire to meet a potential partner who matches his/her interests and personal preferences. Prior art conventional Internet dating services enable a person to create a personal profile including the person's characteristics, hobbies and preferences. The conventional dating service runs a query in a database of profiles, i.e., "profile catalog", to produce a list of matching profiles based on the personal profile. Once a match has been determined, both sides can communicate for instance by telephone or over a data network e.g. the Internet until they decide to meet for a date. A representative example of a prior art dating service is disclosed in U.S. Pat. No. 6,061,681 entitled "On-Line Dating Service for Locating and Matching People Based on User Selected Search Criteria".

Conventional dating services suffer from many disadvantages. Often the preliminary communications are time consuming, costly, exasperating and postpone a first frontal meeting which determines the nature of any future relationship between the individuals. Another drawback of conventional dating services is related to privacy. The method used in conventional Internet dating services is based on a search through a "catalog" of personal profiles of registered members. Each member can search and view profiles of many other registered members. This poses a privacy problem since a registered member cannot control specifically and in advance to whom he/she wishes to expose his/her personal profile. Another drawback is that prior art dating services are prone to fraudulence e.g. personal misrepresentation or otherwise inaccurate disclosure of information causing disappointment on the part of one or both individuals upon meeting for the first time.

Furthermore, prior art dating services administer uniformity of style between the profiles of the members by requiring each member to complete a standard personal information form. Uniformity of the personal information is required to enable querying the database of member profiles based on previously determined criteria. Hence, a member of a prior art dating service is not provided with the opportunity to present and express himself/herself in a unique and individual way.

A prior art dating service can generate revenue only after the dating service has acquired a sufficiently large customer base. Having a large customer base is essential for initiating and perpetuating the operation of the prior art dating service.

Koester, U.S. Pat. No. 6,594,502, entitled "Dating System" disclosed a dating system in which a potential date notices a registered member of the dating system driving his/her automobile and the potential date contacts the dating service based on an identifier such as the license plate of the automobile. The disclosure of U.S. Pat. No. 6,594,502 suffers from several disadvantages. First, searching for a date is most safely performed not while operating a motor vehicle. Furthermore, the concept of U.S. Pat. No. 6,594,502 is appropriate for drivers only and only when a single driver operates the automobile. Otherwise, the potential date will be inquiring about the wrong person.

There is thus a need for, and it would be highly advantageous to have a system and method for providing dating services in a way that overcomes disadvantages of conventional dating services, the method based on receiving a 'dating card' which directs a recipient of the dating card to a secure network resource providing personal information about the dating card owner.

SUMMARY

According to the present invention there is provided a method for providing a dating service using a computer network. A registered member of the dating service acquires one or more security keys and presents a security key to a potential date. When the potential date inputs the security key into the dating service system, the potential date accesses personal information of the registered member. Preferably, when the potential date inputs the security key from a personal computing system, including but not limited to, a PC, a laptop, a mobile/handheld device (e.g. smartphone, computer tablet, iPad™, etc.), personal information regarding the potential date is accessed from the personal computing device. Additionally or alternatively, personal information regarding the potential date can be accessed from a network service (e.g. Facebook™, Google™, Twitter™, etc.) to which the potential date is registered. Furthermore, should the potential date insert the security key from a non-personal computing device, e.g. a public or workplace computer, whilst logged into a session of an aforementioned network service, the dating service system will access the personal information from the logged-in user. Of course, any and all information accessed by the dating service system is subject to security protocols and permissions, including permission from the potential date.

Preferably, subsequent to accessing, further accessing the personal information using the security key is limited to solely the potential date. Preferably, the security key is included as part of a dating card. Preferably, the security key is embodied in a form such as a plastic card, a paper card, adhesive sticker, a leaflet, a magnetic card, and an electronic card. Preferably, the security key provides the accessing just once. Preferably, prior to acquiring security keys, the registered member customizes a personal Web site or a profile webpage including his personal information. Preferably, the customizing includes associating items of the personal information with graphical images presented on a user interface. Prior to accessing personal information, the potential date registers with the dating service or access by the potential date is limited to a portion of the personal information until registration of the potential date. Preferably, the registered member can determine if the potential date has accessed personal information. Alternatively, the potential date contacts the registered member using the personal information. Preferably, the registered member assigns a personal message for the potential date based on the security key.

According to the present invention there is provided a dating card issued to a registered member by a provider of a dating service, the registered member having supplied personal information to the provider. The registered member, upon receiving the dating card, becomes a dating card owner. The dating card includes a security key, wherein upon a potential date receiving the dating card from the card owner and inputting the security key to the provider through a computer network, the potential date is allowed access to the personal information. Preferably, the dating card further includes an expiration date, and the security key is valid allowing the access solely prior to the expiration date. Preferably the dating card further includes a nickname as a sole identifier of the card owner. Preferably, the dating card further includes an identifier of the provider. Preferably, the dating card further includes a detachable portion for tracking the potential date by the card owner.

According to the present invention there is provided a system for providing a computerized dating service including an application server and a client. The application server includes:

(i) a personal information manager which manages personal information for a registered member, the personal information stored in memory operatively attached to the application server;

(ii) a member account manager which receives payment from the registered member for a dating card;

(iii) a dating card generator which generates the dating card including a unique security key and a unique tracking key, where the unique tracking key corresponds to the unique security embodied on the dating card; the dating card including the security key preferably being transferrable to a potential date; the unique tracking key being embodied on the dating card on a detachable section of the dating card so that the registered member can detach the detachable section for tracking purposes prior to transferring the dating card to the potential date; (iv) a security module which controls access of a potential date to the personal information of the registered member, upon the security module receiving the security key and wherein the security module controls access of the registered member to the personal information, allowing the registered member to edit the personal information and/or provide a personal greeting to the potential date. Preferably, the dating system further includes the client which communicates with the application server over a computer network, the client running a user application for accessing the personal information, e.g. Web browser or a mobile application.

According to the present invention there is provided a program storage device readable by a machine, tangibly embodying a program of instructions executable by the machine to perform methods for providing a dating service using a computer or mobile network, the methods as described herein.

BRIEF DESCRIPTION OF THE DRAWINGS

The invention is herein described, by way of example only, with reference to the accompanying drawings, wherein:

FIG. 1 FIG. 1A is a simplified block diagram of a system which provides dating services, according to an embodiment of the present invention;

DETAILED DESCRIPTION OF ILLUSTRATIVE EMBODIMENTS

The present invention is of a system and method for matching people socially and providing dating services. Specifically, the system and method includes the use of a dating card which is given by a card owner, i.e., a registered member of the dating service, to a card recipient, i.e., a potential date. The dating card, unlike an ordinary personal or business card, doesn't typically include personal contact information, e.g. address, telephone number, electronic mail address. The dating card includes a security key or dating code e.g. alphanumeric string which enables accessing information from a data network, e.g. Internet by the dating card recipient to learn about the dating card owner. The dating card typically includes an instruction, e.g. an Internet address of a dating service provider, for accessing the personal information of the card owner.

The principles and operation of a system and method of providing dating services, according to the present invention, may be better understood with reference to the drawings and the accompanying description.

It should be noted, that although the discussion herein relates to dating services such as for the purpose of matrimony or for developing other personal relationships, the present invention may, by non-limiting example, alternatively be configured as well for other services and purposes.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention reverses the order of events in comparison with prior art conventional Internet dating services. Unlike a prior art dating service, the method according to an embodiment of the present invention is initiated for instance by a chance encounter. As an example, Sam is a 30 year old eligible bachelor with little time for social activity due to his more than full time occupation as a software engineer. Sam in the past had difficult and sometimes embarrassing experiences resulting from prior art dating services. He was not happy releasing personal information to a database accessed by thousands of women. He also spent considerable time on the telephone, sending electronic messages back and forth before actually meeting women using conventional dating services. On meeting for the first time, Sam found that some of the women he met through the prior art dating service misrepresented themselves or otherwise didn't appear to match their respective profiles as registered with the conventional dating service. Hoping for better results, Sam registers with a new kind of dating service according to an embodiment of the present invention and receives by mail a set of personal dating cards. Sam places a few dating cards in his wallet "just in case". One weekend, dripping in sweat after a basketball game with his friends, Sam and friends head off to the local 7/11 store to buy cold beer. While waiting at the checkout counter, Sam notices a potential date, an attractive woman (hereinafter known by her name "Rosie") buying milk and basic supplies. Rosie isn't wearing "a ring" and she doesn't "look" married. Sam doesn't want to take a chance until Rosie picks up a tabloid paper and starts reading "5 Ways to Catch a Husband". Rosie looks up and catches Sam's eye, Sam notices a slight smile around her lips. Being shy by nature and not dressed for a first frontal encounter, nor interested in such an encounter with his friends around, Sam detaches the tab from one of the dating cards in his wallet and surreptitiously drops the dating card, according to an embodiment of the present invention, in Rosie's shopping bag while she puts the tabloid back on the shelf. Neither Rosie nor Sam's friends noticed the move. When Sam parts from his friends, he takes out the card tab he had detached and uses the dating service mobile app to scan the QR code on it. The mobile dating application recognizes the code and directs Sam to a form where he inputs information about the encounter with Rosie: "Cute girl reading paper in 7/11. Thursday 19:25 PM". This way he will recognize Rosie when she decides to contact him. In addition, Sam writes Rosie a greeting that she will see when she uses the card she received: "Hi. I am Sam. The guy with the basketball shorts who slipped the card into your bag in 7/11. I think that you are really cute and I will be really happy to get a chance to know you."

Following the chance encounter between Sam and Rosie, and obtaining mutual favorable first impressions, Rosie returns to her mother's apartment, glances at her 2 year old son sleeping in a crib, and proceeds to unpack the groceries she purchased for her mother. Rosie notices Sam's dating card, and on closer inspection notices a logo LIKECARD™ and a QR code. On reading instructions on the card, she picks up her mobile phone. Rosie hears her mother in the background mumbling again, "How will you ever get married again, if you are working all the time?" The instructions on the dating card directed Rosie to use her mobile phone to scan the QR code on the card. After scanning the QR code, Rosie receives a decoded URL address. Opening this URL using the mobile browser, Rosie is directed to the dating service website and immediately presented with Sam's profile and the greeting he had written to her. Rosie is surprised to recognize Sam's picture as the sweating figure in basketball shorts who was looking at her in the 7/11 store. Rosie begins to browse through Sam's profile and to think about establishing further contact with Sam.

The present invention, unlike prior art dating services, is not based on searches carried out on a database of registered members. Each registered member or card owner, e.g. Sam, can decide specifically and in advance to whom, e.g. Rosie, to reveal personal information, allowing enforcement of privacy. Furthermore, the card owner allows revealing his/her personal information to another, e.g. Rosie, who has not previously registered with the dating service.

According to embodiments of the present invention, level of service is independent of the number of registered members. Hence, the provider of a dating service can generate revenue as soon as the service is operative.

It should be appreciated that Sam and Rosie would not likely have met using a conventional dating service. Rosie, for instance, just getting over her previous marriage wasn't consciously looking to many again and she did not register in any type of dating service. Sam, although registered was only considering registered profiles of women who were not previously married.

The term 'provider' as used herein refers to the business entity which implements and manages the dating service according to an embodiment of the present invention; The term 'registered member' as used herein refers to an individual who registers with the dating service according to an embodiment of the present invention; The terms 'personal dating profile', 'personal dating homepage', 'personal profile webpage' refer to a mechanism used by a provider to present information personal to the registered member or a card owner. The term 'dating card' refers to a mechanism to transfer a QR code issued by the provider of the dating service to a registered member for private access by a card recipient to personal information of the registered member. The terms 'security key', 'key', 'dating code' and 'code' are used herein interchangeably. The term 'card owner' refers to a registered member that purchased a dating card from the provider and transfers or presents the dating card to an individual, a 'potential date' (PD) in which he/she has personal interest; The term 'card recipient' refers to the 'potential date' subsequent to receiving a 'dating card' from a 'card owner'.

Figure 1A:
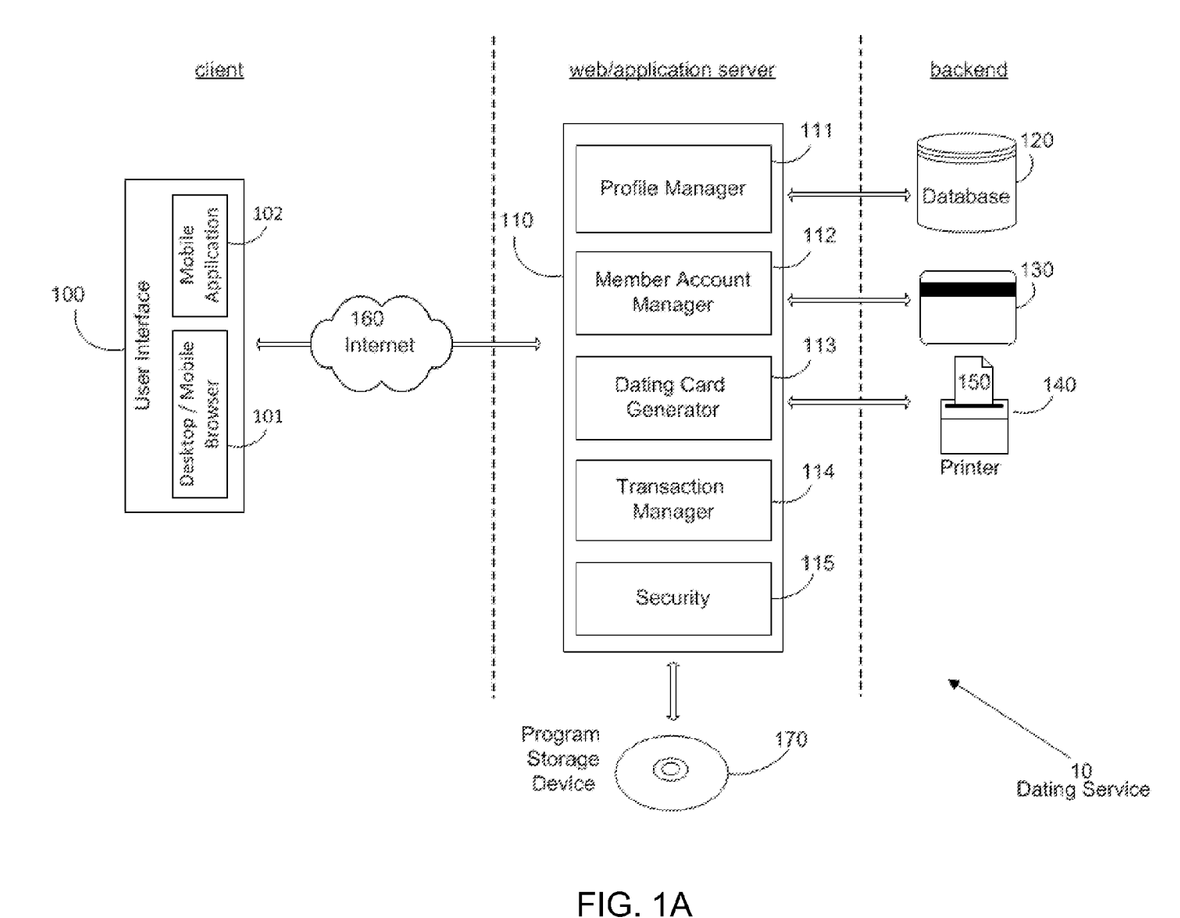

Referring now to the drawings, FIG. 1A illustrates system 10 for providing a dating service, according to an embodiment of the present invention. System 10 includes a computer configured as an application server 110, connected via a wide area network 160, e.g. Internet to a client application 100, e.g. Web browser installed on a client machine or a mobile device 101 (e.g. smartphone, tablet) or a proprietary client application installed on a mobile device 102 (e.g. smartphone, tablet) provided by the dating service provider.

A software application is loaded for instance from optical disk 170 and run in application server 110. Software modules installed and operative in application server 110 are included as follows:

(a) A personal profile manager 111 manages multiple personal dating profiles allocated to registered members and stores personal information of registered members. The personal profile manager module preferably also enables a registered member to manage a personal 'blog' and/or bulletin board and/or internal email system through which he/she can communicate with other registered members.

(b) A member account manager 112 manages financial accounts of the registered members and receives payment for instance using a payment card 130. Member account module 112 accepts secure payments from a registered member and preferably manages transactions with third party clearing houses. Registration for the dating service can be free of charge or per fee. Registered members are required to pay for all or part of the benefits they receive from the dating service (e.g. purchase of dating cards).

(c) A dating card generator 113 generates (e.g. prints) dating cards 150 on a dating card printer 140. Dating card generator 113 produces dating cards 150 according to a previously defined design preferably designed by the registered member. The dating card generator prints the unique matching QR codes on the card ('potential date (PD) segment') and on the card tab ('tracking segment'). A QR code 157A is printed on the card for the card receiver and a matching QR code (could be the same or a complementing one, i.e., a unique QR code which is related to—and corresponds to—the unique QR code on the card) 157B is printed on the card tab for the card owner. Alternatively, the dating card generator 113 can output a graphical file in various formats to be processed by a third party printing house. In addition, the dating card generator 113 prepares contact information e.g. name, address printed on envelopes used for delivering the dating cards to the registered member. Alternatively, the dating card generator 113 can output a graphical file in various formats to be sent via electronic mail to the mailbox of a registered member to be printed on printer 140 by the registered member for instance at home.

(d) A transaction manager module 114 manages personal contacts made between registered members and dating card recipients. Transaction manager module 114 records all contacts with the dating service 10. Each time a card recipient scans the QR code 157A from dating card 150 and each time the card owner scans the QR code from the tab 157B, the action is recorded allowing the card owner to monitor and control access to his/her personal dating profile.

(e) A security module 115 enforces a security policy that prevents the exposure to unauthorized parties of personal information. Other than the registered member, only recipients of a valid dating card 150 are allowed access to personal information in member database 120. In addition, security module 115 is responsible to verify that each QR code 157A associated with dating card 150 is used exclusively by a single dating card recipient. Reuse of dating card 150 by unauthorized individuals is preferably not permitted.

A database 120 stores the personal information in memory i.e., a storage device such as a hard magnetic disk. The personal information is uploaded by the registered member for the purpose of customizing his/her 'personal dating profile'. In addition, database 120 stores the QR codes 157A 157B assigned to the registered member when he/she is issued dating cards. The term "memory" as used herein, for instance to store database 120, refers to any volatile or non-volatile storage mechanism including read only memory, random access memory, EPROM, EEPROM, flash memory, magnetic memory, optical memory, floppy disk, hard disk, and/or optical disk.

A user interface module 100 is for instance an Internet browser application running on a desktop computer or a mobile phone or a standalone client application installed on a desktop computer or a mobile phone that enable users to register with the dating service. User interface module 100 is used by registered members to design, customize and manage a 'personal dating profile', to design and customize personal 'dating cards' and to purchase dating cards. User interface module 100 is further preferably used by potential dates to view the 'personal dating profiles' of other registered members and to enable correspondence between the card hander/owner and card receiver.

Figure 1B:
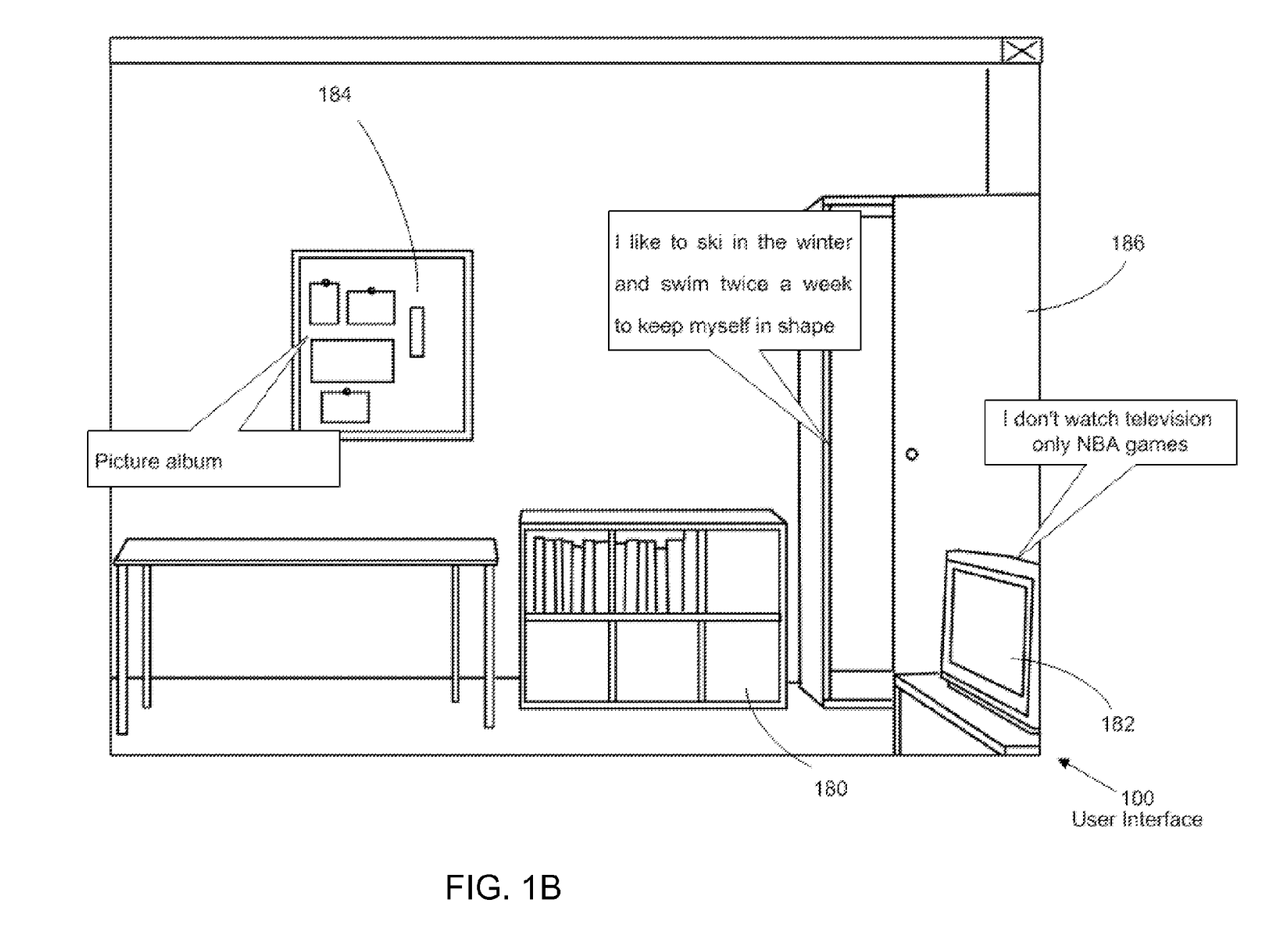
FIG. 1B is an illustrative example of a user interface useful to present personal information to a recipient of a dating card, according to an embodiment of the present invention.

A preferred embodiment of user interface module 100 is illustrated in FIG. 1B a versatile mechanism for presenting personal information to a dating card recipient, i.e., a potential date. FIG. 1B shows an image of a room including for instance a bookcase 180, a television receiver 182, a bulletin board 184 and a closet 186. Preferably, the dating card recipient selects an item and is presented personal information of the card owner specific to the item selected. Specifically, a mouse click on television 182 yields, "I don't watch television only NBA games" and on selecting closet 186, pops up an image of skis, and swimming goggles along with a message "I like to ski in the winter and swim twice a week to keep in shape". The card recipient selects bulletin board 184 causing photographs of the card owner to pop up.

Figure 1C:
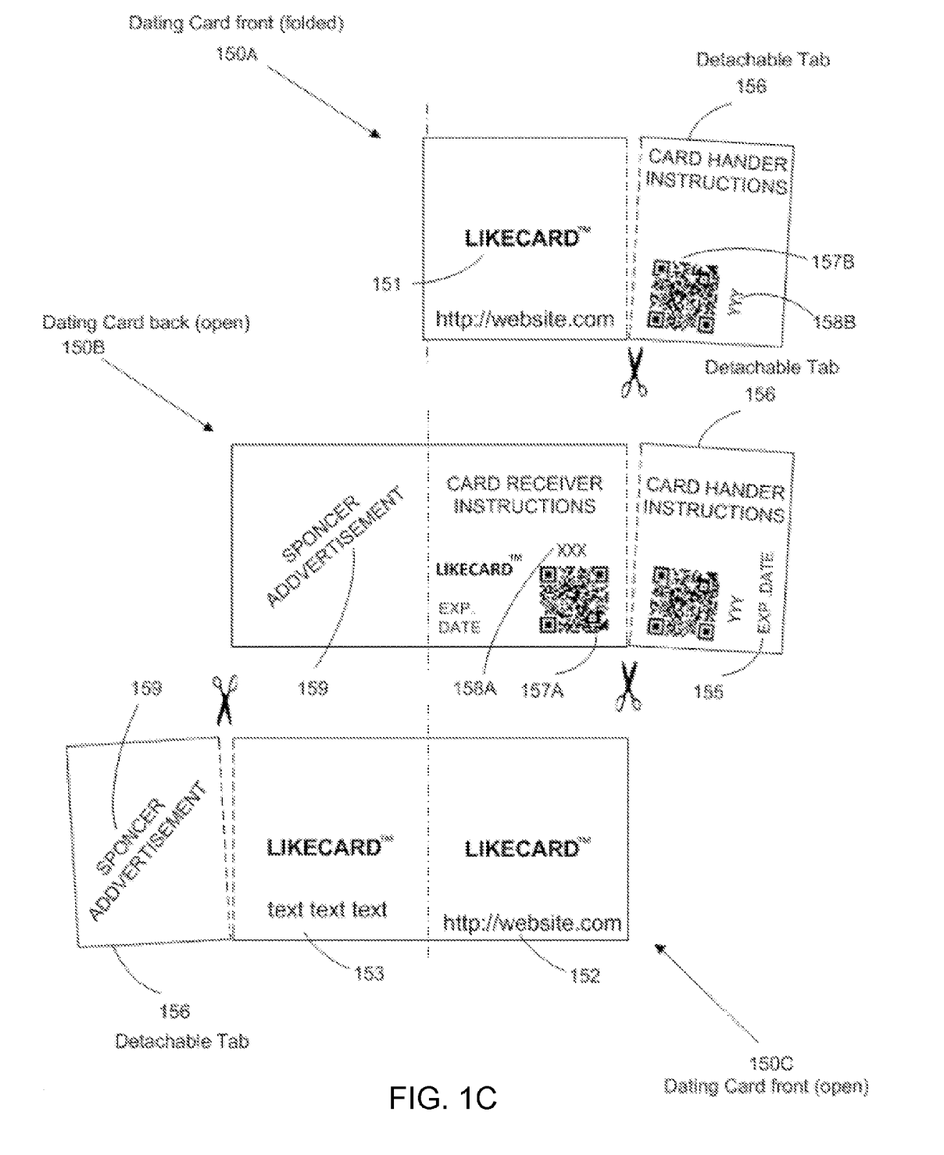
FIG. 1C is an illustration of a dating card, according to an embodiment of the present invention.

Reference is now made to FIG. 1C illustrating dating card 150 according to an embodiment of the present invention. Dating card 150 includes two complementing QR codes 157A 157B printed on dating card 150, and/or electronically or electromagnetically embodied in dating card 150. Dating card 150 can take the form of a common business card, a plastic card, a flyer, a leaflet, an adhesive sticker, a voucher, a souvenir, a magnetic card, an electronic card with RF transponder, or any other implementation that enables transfer of or otherwise presenting QR code 157A 157B. Dating card 150 preferably further includes an expiration date 155 of dating card 150 as determined by dating card generator module 113. A registered member can customize card owner information 153 that appears on dating card 150. Card owner information 153 includes but is not limited to: nick name, title, motto, etc. Card information 153 preferably does not include identifying information such as name, address, telephone number, and electronic mail address. Optionally the registered member can customize the design and appearance of dating card 150 by adding elements (not shown in FIG. 1B) such as but not limited to background images, personal photographs, patterns and designs according to previously defined themes related to gender, personality, mood, etc. Dating card 150 may include an identifier e.g. logo 151 of the provider of the dating service along with an address, typically an Internet address 152 of the provider. Optionally dating card 150 can include third party sales promotion on designated areas on the card and card tab 159. The dating card 150 includes a detachable tab 156 having a complementing QR code 157B to the one on the card 157A. Each card has a unique QR code 157A. Preferably the QR code on the card tab 157B matches the QR code on the card 157A but is unique by itself. When a card owner (e.g. Sam) hands out dating card 150 to a potential date (e.g. Rosie), tab 156 is detached. When the card owner scans the QR code on the card tab 157B (preferably using a scanning application installed on a mobile phone 249A) and sends the decoded information to the dating service application, the application enables the card owner 230 to record information 251 that will help the card owner identify, i.e., track the recipient of the dating card e.g. "7/11 Thursday evening, woman reading paper". In addition, the card owner can write a greeting 250 to the card receiver that will be presented to the card receiver as soon as he/she will visit the dating profile of the card owner. The Transaction Manager 114 records a connection between the QR code on the card 157A, the QR code on the tab 157B and the data inputted by the card owner 250 251. When the recipient (e.g. Rosie) of dating card 150 visits the personal dating profile of the card owner or otherwise contacts the card owner, the card owner receives a notification with a reference to the recorded information 250 251.

The QR code on the card 157A and the QR code on the tab 157B can be scanned preferably by a third party scanning application installed on a mobile device 249A or by a proprietary client application 102 installed on a mobile device that communicates with the application server 110 of the dating service.

Figure 2:
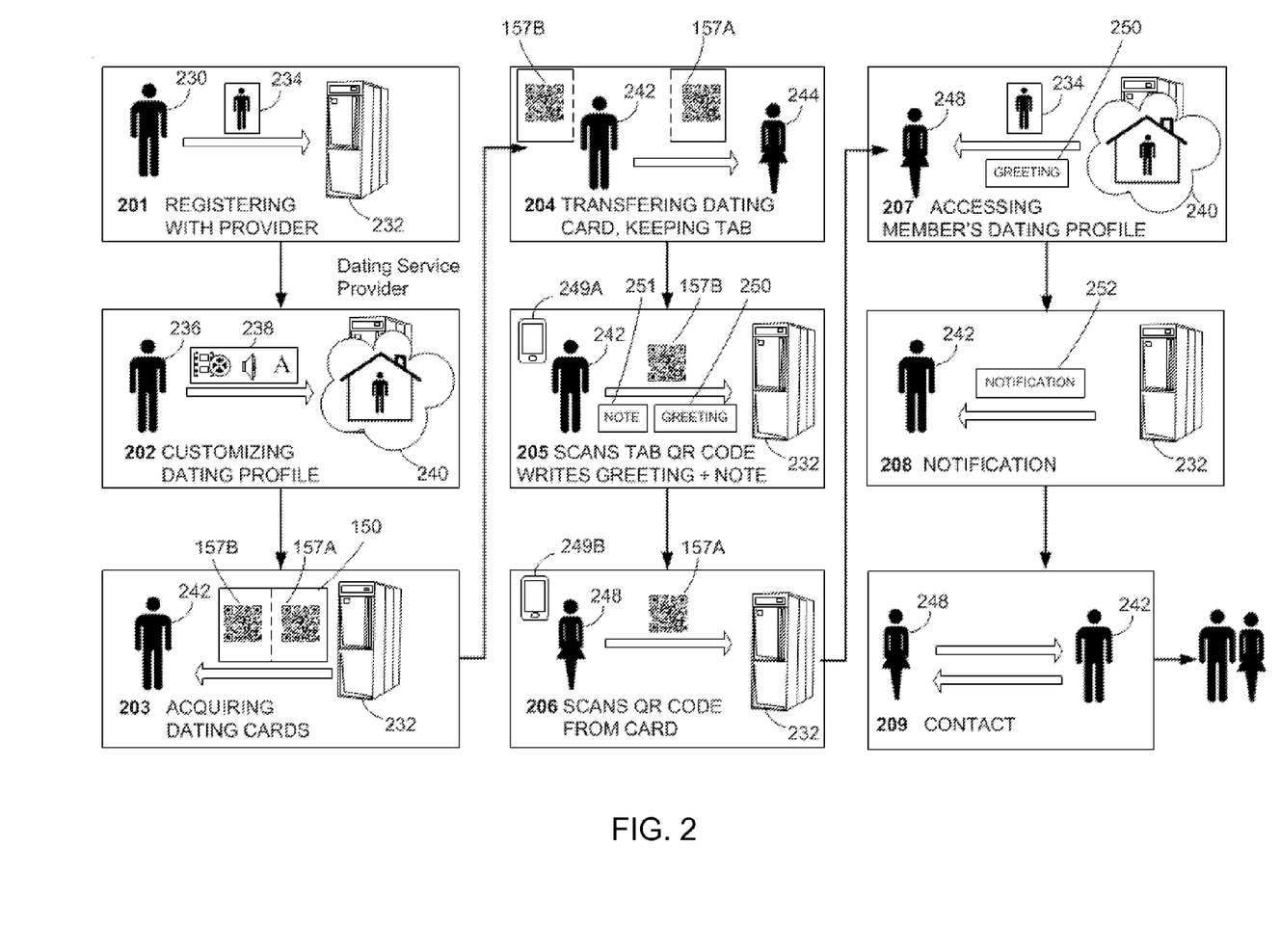
FIG. 2 is a flow diagram of a method for providing dating services according to an embodiment of the present invention.

Reference is now also made to FIG. 2 a flow diagram illustrating a dating service according to an embodiment of the present invention. Returning to the example of Sam and Rosie, Sam as a user 230 registers (step 201) with the dating service provider 232 typically by entering the Internet web site of provider 232. Sam enters basic personal information 234 i.e., first and last name, gender, age, occupation, residence typically using a Web form. Sam then becomes a registered member 236. Personal website manager module 111 enables registered member 236, e.g. Sam to design and manage (step 202) his personal dating profile 240. Sam is asked to enter basic personal details and receives personal credentials for login into the dating service. Sam chooses from a previously determined list of categories of interest, e.g. music, reading, sports. Sam customizes (step 202) his personal dating profile and optionally adds to these categories personalized content 238 e.g. images, video, audio, text, etc. uploaded to the server 110. Sam can also customize the graphical format of his personal dating profile 240 for instance according to FIG. 1B.

After registering (step 201) and customizing (step 202) his personal dating profile only Sam is allowed access to his personal dating profile. At this stage, preferably no other registered member can enter the member's personal profile. Sam is issued a number of dating cards 150 each having a unique QR code on the card 157A and a unique QR code on the tab 157B by dating profile manager 111. Sam who acquired dating cards 150 can receive them (step 203) in hard copy through the post or as an image file via electronic mail. Sam chose receiving (step 203) dating cards 150 through the post after customizing the appearance of the dating cards 150. After receiving cards 150, Sam is a card owner 242.

As a registered member, Sam can at any time log into the dating service website by using his user name and password. Once logged in Sam can update and further customize (step 202) the content of his personal dating profile by uploading personal content and/or revise the appearance of his personal dating profile. Sam meets Rosie, a potential date 244, in a chance encounter, detaches the tab 156 from the dating card and transfers (step 204) dating card 150 to Rosie.

Sam uses the proprietary mobile application 102 he had installed in advance on his mobile phone 249A to scan the QR code on the tab 157B. He is forwarded to the dating service website where he writes Rosie a personal greeting 250 and writes some notes to himself 251 about Rosie so he will remember the encounter when she contacts him. When Rosie uses a third party QR scanning application installed on her mobile 249B to scan the QR code 157A on the card. The browser on her mobile phone forwards her to the dating service website. The QR code 157A associated with dating card 150 grants Rosie access to Sam's personal dating profile. Access to Sam's personal dating profile may be limited to one time or multiple times or unlimited times. The QR codes 157A 157B are not known in advance to Sam. Therefore, Sam cannot create replacement or additional cards 150 with QR codes 157A 157B without prior purchase from the provider. Each time Sam purchases dating cards 150 he is allocated new QR codes 157A 157B with preferably previously determined expiration dates 155. Once expired, QR codes 157A do not grant access to personal dating profiles. After receiving (step 204) dating card 150, Rosie is now a card recipient 248. Rosie may choose to scan the QR code 157A using a third party QR scanning application pre-installed on her phone 249B or type in the URL address 152 on the card in her desktop browser 101 and follow the instructions how to install the client mobile application 102 on her phone 249B to scan the code.

Rosie has a third party QR scanning application already installed on her mobile 249B. Rosie scans (step 206) the QR code 157A and the mobile browser forwards her to the dating service website and she immediately presented with Sam's personal dating profile. After Rosie scans the QR code 157A, preferably no other users or registered members are able to use the same QR code 157A. Preferably this can be achieved by having the client mobile application 101 take the form of a "Facebook Application" and implement "Facebook Connect". Rosie will be required to "accept" the "Facebook Application" before she is allowed to proceed to view Sam's dating profile, thus creating a one-to-one relation between the QR code 157A and Rosie's user id in "Facebook". This connection will be stored 120 by the Transaction Manager 114. If someone other than Rosie will scan the code 157A and try to use his/hers "Facebook" login to access Sam's profile, the Security Manager 115 will determine that the QA code 157A is already associated with Rosie's "Facebook" user id and will deny the access. When Rosie visits Sam's personal dating profile 207 Rosie receives the personal greeting 250 Sam has written her. Sam receives (step 208) a notification 252 either by email or via the proprietary client application 101 he had installed on his mobile device 249A. The notification 252 is associated with the note 251 Sam had written to himself in order to have a reminder of the encounter with Rosie. Preferably the proprietary mobile client application 101 will be integrated with "Facebook" and Sam will receive a notification 252 in his "Facebook" account as well. Alternatively or additionally, the system can interact with any network service, such as those services the commonly referred to as social networks. In another embodiment of the present invention, Rosie can be granted only limited access to Sam's personal dating profile. Limited access can prevent Rosie from obtaining for instance Sam's personal contact information, e.g. telephone number. In order to obtain the additional contact information, Rosie is required to register to the dating service (step 201). In yet another embodiment of the present invention, Rosie can be denied any access (step 207) to the personal dating profile of the card owner until registering (step 201). Alternatively, Rosie can be granted access to Sam's personal profile free of charge or Rosie can be charged per access session using various payment methods (e.g. micro payments, cellular reverse billing, credit card). Preferably, Rosie is granted access to Sam's personal profile site as long as dating card 150 is within expiration date 155. Expiration date is maintained in memory 120 for instance from the time dating card 150 is issued. Rosie after accessing (step 207) the content of Sam's personal dating profile can decides whether she wishes to date Sam. Rosie may obtain personal contact information e.g. Sam's telephone number to contact (step 209) Sam if she so decides. Alternatively or in addition, Sam can look up at any time which card recipients, e.g. Rosie have accessed (step 207) his personal profile. Sam can identify Rosie by referring to the note he wrote to himself 251 which is associated to the QR code 157A on the card he gave to Rosie (step 204). The contact information of the recipient, e.g. Rosie's telephone number, is preferably not revealed to Sam. However, Sam may send to Rosie a message through the dating service. Preferably, if implementing "Facebook Connect" Rosie's public information in "Facebook" (profile picture, name, date of birth, etc.) is revealed to Sam. Sam may control access to his personal dating profile by blocking certain dating codes 157A, for instance all dating codes 157A other than the one Rosie received, from accessing his personal dating profile. Furthermore, in some embodiments, the QR code on the card can forward the card receiver to a façade of the personal dating profile. The card owner can customize the dating profile in such a way that each card receiver views different or partial information. The dating profile does not have to be static. E.g. one potential date will see a playful profile and another, a more serious profile based on how the card receiver judges their personality Getting back to Sam, shortly after the beer was consumed, Sam bid his friends farewell and headed home for a shower. While drying off, clad only in a robe he turned on his computer and decided to check out his new dating service. He was surprised to see that a woman named Rosie accessed his newly designed personal profile. The note 251 associated with Rosie helps him remembered the 7/11 store. Shortly thereafter the telephone rings. After introducing herself Rosie says, "I saw from your dating profile that you watch basketball, so do I. There's a Knicks game on TV, do you want to watch at my place?"

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

As such, those skilled in the art will appreciate that the conception, upon which this disclosure is based, may readily be utilized as a basis for the designing of other, methods and systems for carrying out the several purposes of the present invention. It is important, therefore, that the claims be regarded as including such equivalent constructions insofar as they do not depart from the spirit and scope of the present invention.

The dating card, in some embodiments, includes a coupon segment. The coupon segment includes a unique QR code-enabled coupon embodied thereon. The coupon is redeemable at/with a given sponsor (e.g. Amazon, Starbucks etc.) who is registered with the dating service. Upon scanning the unique QR code-enabled coupon or the unique PD QR code with a personal computing device (e.g. smartphone), the sponsor receives segmentation information related to said personal computing device vis-à-vis personal information stored in registered accounts of online networks (Facebook, Twitter Google+ etc.). Advertisers can use this invention as a platform to display customized advertisements for the card receivers while they browse the personal dating profile of the card owner based on their profile information collected from social networks login e.g. Facebook connect. E.g. if a card owner hands out a branded card that he acquired in Starbucks, the card receiver upon scanning the QR code will be forwarded to a the dating profile of the card receiver that is customized with the Starbucks brand features.

While the invention has been described with respect to a limited number of embodiments, it will be appreciated that many variations, modifications and other applications of the invention may be made.

Main innovations of the immediate invention:
Use QR codes for quick and convenient access via mobile phone access of dating profiles.
Different QR codes (complementing) on each card and each tab.
Card owner can use the Tracking QR code on tab to leave dynamic information for card receiver that can be retrieved using the PD QR code on the card.
Folded card looks like a personal greeting card with a detachable tab distinguished from a regular business card.
Sponsors can dynamically change advertisements/coupons received when the unique coupon QR code on the card based on segmentation information about the PD recipient of the card, based on Facebook™ (or similar registered network account including personal profile information) account information of PD recipient.
Proprietary mobile application for scanning the dating cards, managing the dating profiles and contacts between card owner and card receiver
Only one receiver can use code using 'Facebook™ Connect' or similar application, so that a dating card cannot be transferred from one person to another, and in some embodiments, the coupon segment cannot be transferred from one person to another either.
Card can be blocked.

What is claimed:

1. A method for initiating contact for the purpose of social matching, comprising the steps of:
   a. providing a social matching card comprising:
      (i) recipient segment including a unique recipient access code embodied thereon, and
      (ii) a tracking segment including a unique tracking access code embodied thereon which corresponds to said unique recipient access code on said recipient segment;
   b. configuring said recipient access code for transferring, via said recipient segment to a recipient;
   c. configuring said tracking access code for retaining, via said tracking segment, by an owner of said social matching card;
   wherein scanning said unique tracking access code provides access to an editable version of an online profile stored in a social matching service database and registered to an owner of the tracking segment; and
   wherein scanning only said unique recipient access code provides access to a non-editable version of said online profile.

2. The method of claim 1, further comprising providing said editable personalized greeting message platform to said registered owner of said tracking segment, wherein said online profile is a unique online profile, viewable only upon scanning any of said unique recipient and/or tracking access codes.

3. The method of claim 1, wherein said unique tracking access code comprises a unique QR code that encodes a hypertext link to said editable version of said online profile, and wherein said unique recipient access code comprises a unique QR code that encodes a hypertext link to said non-editable version of said online profile.

4. The method of claim 1, further comprising notifying said registered owner of said tracking segment that said recipient has accessed said non-editable version of said online profile.

5. The method of claim 1, further comprising enforcing a security policy comprising:
   associating, at a first access to said non-editable version of said online profile by said recipient, said recipient access code with a unique recipient ID associated with said recipient; and
   granting any subsequent access to said non-editable version of said online profile only to said recipient associated with said unique recipient ID.

6. A social matching card comprising:
   (a) a recipient segment including a unique recipient access code; and
   (b) a tracking segment, including a unique tracking code which corresponds to said unique recipient access code in said segment, wherein scanning said unique tracking access code provides access to an editable version of an online profile stored in a social matching service database and registered to an owner of the tracking segment, and wherein scanning only said unique recipient access code provides a recipient of said recipient segment unique hypertext link to a non-editable version of said online profile.

7. The social matching dating card of claim 6, further comprising:
   a coupon segment including a unique access code-enabled coupon embodied thereon, said coupon redeemable with a given sponsor registered with said social matching service, wherein upon scanning of said unique access code-enabled coupon with a personal computing device, said given sponsor receives segmentation information related to said personal computing device vis-à-vis personal information stored in at least one registered account of an online network.

8. The social matching card of claim 7, wherein said online profile includes advertising information from said given sponsor.

9. The social matching dating card of claim 8, wherein said advertising information is customized according to said segmentation information.

10. The social matching card of claim 7, wherein said given sponsor provides customized advertising information to an owner of said at least one registered account, said customization based on said received segmentation information.

11. The method of claim 6, further comprising providing said editable personalized greeting message platform to said registered owner of said tracking segment, wherein said online profile is a unique online profile that is accessible only by scanning any of said unique recipient and tracking access codes.

12. The social matching card of claim 6, wherein said unique tracking access code comprises a unique QR code that encodes a hypertext link to said editable version of said online profile, and wherein said unique recipient access code comprises a unique QR code that encodes a hypertext link to said non-editable version of said online profile.

13. The social matching card of claim 6, wherein a transaction manager is configured to notify said registered owner of said tracking segment that said recipient has accessed said non-editable version of said online profile.

14. The social matching card of claim 6, further comprising a security module configured to:
- associate, at a first access to said non-editable version of said online profile by said recipient, said recipient access code with a unique recipient ID associated with said recipient; and
- grant any subsequent access to said non-editable version of said online profile only to said recipient associated with said unique recipient ID.

15. A system for initiating contact for the purpose of social matching, the system comprising:
- a social matching service database configured to store a profile in association with a registered owner of a social matching card; and
- at least one server configured to:
  - provide said registered owner of said social matching card access to an editable version of said online profile via a unique tracking access code provided on a tracking segment of said social matching card, and to provide a recipient of a recipient segment of said social matching card access to an non-editable version of said online profile via a unique recipient access code provided on said recipient segment, wherein said unique tracking access code is associated with said unique recipient access code, and wherein said unique tracking access code and said unique recipient access code are unique to said social matching card.

16. The system of claim 15, wherein said at least one server further comprises a transaction manager configured to notify said registered owner of said tracking segment that said recipient has accessed said non-editable version of said online profile.

17. The system of claim 15, wherein said at least one server further comprises a security module configured to:
- associate, at a first access to said non-editable version of said online profile by said recipient, said recipient access code with a unique recipient ID associated with said recipient; and
- grant any subsequent access to said non-editable version of said online profile only to said recipient associated with said unique recipient ID.

18. The system of claim 15, wherein said online profile is a unique online profile that is accessible only by scanning any of said unique recipient and/or tracking access codes.

19. The system of claim 15, wherein said server is further configured to provide said editable personalized greeting message platform to said registered owner of said tracking segment.

20. The system of claim 15, wherein said unique tracking access code comprises a unique QR code that provide a hypertext link to said editable version of said online profile, and wherein said unique recipient access code comprises a unique QR code that provide a hypertext link to said non-editable version of said online profile.

* * * * *